United States Patent

[11] 3,603,639

| [72] | Inventor | Betty A. Wilson<br>5240 E. Pickard, Mount Pleasant, Mich. 48858 |
|---|---|---|
| [21] | Appl. No. | 825,486 |
| [22] | Filed | May 19, 1969 |
| [45] | Patented | Sept. 7, 1971 |

[54] DETACHABLE SEAT PAD FOR SNOWMOBILES AND THE LIKE
10 Claims, 6 Drawing Figs.

[52] U.S. Cl. .................................................. 297/219, 180/5 R, 180/9.24 R
[51] Int. Cl. ................................................. A47c 31/02
[50] Field of Search .......................................... 297/219, 218, 229, 455, 214, 461, DIG. 1, 228; 5/354

[56] References Cited
UNITED STATES PATENTS
| 659,251 | 10/1900 | Nerad | 297/218 |
| 1,892,913 | 1/1933 | Timm | 5/354 |
| 2,834,970 | 5/1958 | Nappe | 5/344 |
| 3,025,104 | 3/1962 | Murphy | 297/218 |
| 3,220,767 | 11/1965 | Hendrickson | 297/219 |
| 3,278,226 | 10/1966 | Magnusson | 297/219 |
| 3,311,408 | 3/1967 | Sarvas | 297/218 |

*Primary Examiner*—Francis K. Zugel
*Attorney*—Learman, Learman & McCulloch

ABSTRACT: A detachable seat pad for use on the seat of a snowmobile and the like including an upper portion adapted to overlie the top of the snowmobile seat and side portions adapted to extend along opposite sides of the seat. Nonadhesive means is provided for releasably securing the side portions to the side of the seat and preferably includes confronting bristles having free ends provided with interengageable hooks.

PATENTED SEP 7 1971  3,603,639

INVENTOR
BETTY A. WILSON 3,603,639

DETACHABLE SEAT PAD FOR SNOWMOBILES AND THE LIKE

This invention relates to a detachable seat pad and more particularly to a seat pad which releasably may be secured to the seat of a snowmobile and the like.

With the recent advent of snowmobiles, a new and exciting winter sport and pastime has been popularized. Due to their nature, snowmobiles are commonly employed in a low-temperature environment. After a relatively short period of time, the user of a snowmobile becomes uncomfortable because of the cold. The portions of the user's body which are directly supported by the vehicle itself are particularly affected by the cold. As opposed to conventional seats where the legs of the user depend along the front of the chair or seat, it is the inside portions of the legs which normally extend along the sides of the snowmobile seat and are subjected to discomfort. It is desirable, therefore, that a pad be provided which will aid the user in keeping the insides of his legs warm in addition to those parts of his body directly supported by the vehicle.

In order to eliminate drag due to wind resistance, the apparatus for securing the pad to the seat of the snowmobile must present a clean profile to the airstream. Moreover, because snowmobiles are presently in existence without a detachable pad formed according to the invention, the securing apparatus must be simple, inexpensive and one that does not require extensive modification to existing snowmobiles. Further, to utilize the flexibility of the snowmobile to its fullest advantage, the pad must be one which may be securely fastened to the seat and yet be quickly detachable.

An object of the invention is to provide a device for use on snowmobiles and the like which will reflect the heat emanating from a body that is supported thereby.

Another object of the present invention is to provide a seat pad which can be quickly installed on the seat of a snowmobile without requiring modification thereof.

Yet another object of the present invention is to provide a detachable seat pad for snowmobiles and the like which will provide the user with a self-warming device which covers both the top and side portions of the vehicle seat.

A further object of the present invention is to provide a detachable seat pad for snowmobiles and the like which can be readily removed and installed as desired.

A still further object of the present invention is to provide a detachable seat pad which is so constructed that the insulating material in the seat and side portions will be separated.

In accordance with the present invention, there is provided a detachable seat pad for the seat of snowmobiles and the like which includes a top portion adapted to overlie the top of the seat and side portions adapted to extend along the sides of the seat. Securing means are provided for detachably securing the side portions of the pad to the sides of the seat and preferably include closely spaced apart bristles having flexible hook-shaped ends. Each of the side and top portions preferably includes an external layer of material, an internal layer of material and a layer of heat insulating material therebetween.

Other objects and advantages of the present invention will be pointed out specifically or will become apparent from the following description when it is considered in conjunction with the appended claims and the accompanying drawings, in which:

Figure 1:
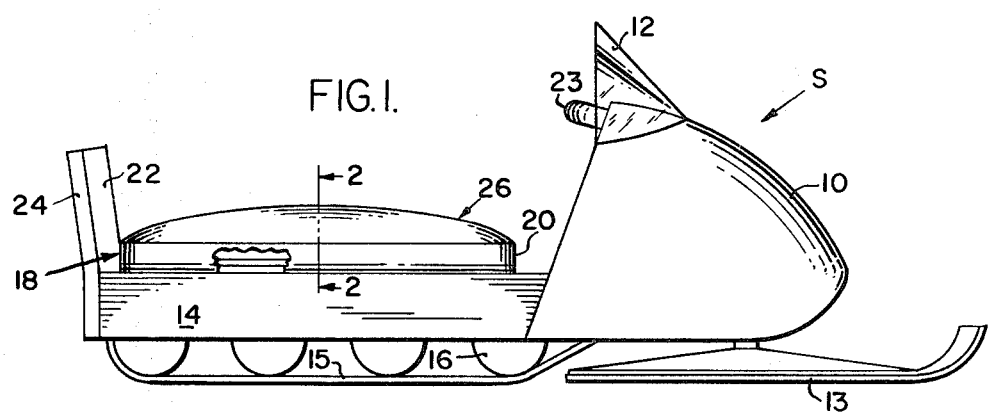
FIG. 1 is a side elevational view illustrating a detachable seat pad constructed and mounted on a snowmobile according to the invention.

A snowmobile on which the device according to the invention is to be mounted is shown generally at S and includes a front hull 10 having a deflector window 12 extending from the upper portion thereof and a pair of ski runners, one of which is shown at 13, depending from the lower portion thereof. The main body 14 extends rearwardly of the front hull 10 and mounts suitable support members such as rollers 16 around which an endless belt 15 is trained. The rollers are connected with a suitable source of power such as a gasoline engine, not shown. A seat, generally designated 18, is secured to the upper side of the body portion 14 and includes a lower, horizontally extending seat portion 20 and a vertically inclined backrest portion 22 adapted to accommodate the back of a person seated on the seat 18. An upwardly extending brace 24 is secured to the rear portion of the body 14 and is inclined vertically to form a suitable support for the backrest portion 22. An operator may sit on the seat 18 and steer the snowmobile S by means of handles 22 provided on the hull 10. If desired, one or more persons also may be seated upon the seat 18 behind the operator. The handles of the vehicle normally incorporate the vehicle controls so that the operator need not remove his hands from the handlebars when the vehicle is in operation.

Figure 2:
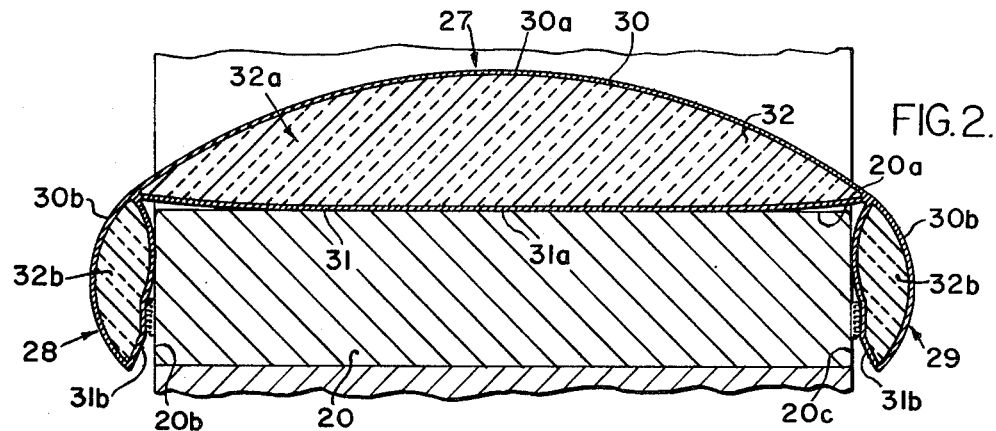
FIG. 2 is an enlarged sectional view taken on the line 2—2 of FIG. 1.
Figures 3, 4, 5, 6:
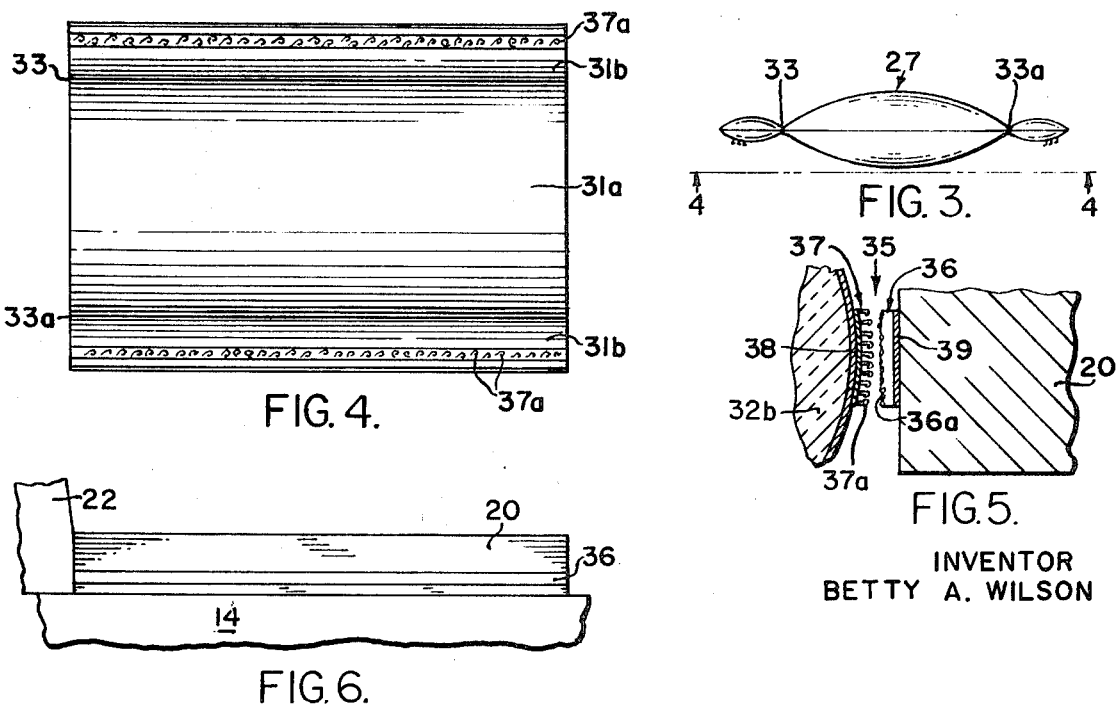
FIG. 3 is an elevational end view of the detachable seat pad formed according to the invention.
FIG. 4 is a bottom plan view taken along the line 4—4 of FIG. 3.
FIG. 5 is an enlarged view illustrating a detail of the invention.
FIG. 6 is a fragmentary side elevation view illustrating the securing apparatus attached to a snowmobile.

When the operator and/or riders remain on seat 18 for any extended period of time, their bodies become cold and hence further participation in the sport of snowmobiling is curtailed or rendered uncomfortable. To alleviate this, a detachable seat pad constructed in accordance with the present invention is mounted on the seat 18 of the snowmobile. The seat pad is shown generally at 26 and comprises an upper seat portion 27 for covering the top 20a of the seat 20 and oppositely disposed side portions 28 and 29 which are adapted to engage the opposite sides 20b and 20c of seat 20. As shown in FIG. 2, the top and side portions are formed from a continuous outer layer of material 30 including a middle portion 30a and side portions 30b, a continuous inner layer 31 having a middle portion 31a and side portions 32b, and a layer of heat insulating material 32 disposed between the inner and outer layers shown at 32a for the middle portion and 32b for the side portions. As shown in FIGS. 2 and 3, the cross-sectional area of the seat pad is not uniform and at a pair of laterally spaced-apart zones 33 and 33a, the cross-sectional area of the pad is sharply diminished and the outer layers 30 and 32 are stitched or otherwise suitably secured together, thereby eliminating the possibility of any of the insulating material in the center section 32a from moving to the end sections 32b and vice versa. The intermediate layer 32 may comprise any suitable heat-insulating material which has the effect of reflecting the heat emanating from the body of the user that comes in contact therewith, thereby providing a self-warming cushion. Such materials are commercially available and may comprise cellular artificial resin, for example, polystyrene. The outer layers 30 and 31 protect the material 32 from the elements and preferably include a material impervious to water.

Because of the versatility of the snowmobile and the various uses to which it is put, it is often desirable to have the snowmobile as light as possible and with as little wind resistance as possible such, for example, as when the snowmobile is utilized for racing purposes. Moreover, a nonprotruding securing apparatus is desirable to preclude contact with the user's clothing. Thus, it is desirable in these instances that the pad 26 be readily detachable or secured to the seat in a manner which will be presently described.

As is illustrated in FIG. 2, the side portions 28 and 29 are folded relatively to the top portion 30 at the laterally spaced-apart zones 33 and 33a so that they extend along the side portions 20b and 20c of the seat 20. In order to removably secure the side portions 38 and 29 to the sides 20b and 20c of the seat, means shown generally at 35 are provided on opposite sides of the seat 20. As is best shown in FIG. 5, the securing means includes nonadhesive securing apparatus and comprises mating strips 36 and 37 having cooperating surfaces provided with releasable interconnecting portions. The strip 36 has a plurality of loops 36a having fleecy, velvetlike appearance and texture secured to a band 39. The strip 37 has a burrlike appearance and comprises a plurality of closely spaced, flexible bristles 37a of nylon or other suitable material having free outer ends formed as hooks, the opposite ends of the bristles being secured to or embedded in the band 38. The band 39 may be secured to the opposite sides 20b and 20c of the seat 20 by a suitable adhesive such as an epoxy cement, thereby presenting a clean silhouette to the airstream. The band 38 is secured to the undersides of the portions 31b by stitching or a suitable epoxy cement.

By positioning the hook-shaped portions 37a in overlying relation with the loops 36a and pressing the strip 37 toward the strip 36, the hooks 37a engage the loops 36a of the anchor strip 36 to provide a substantially flat closure throughout the length of the strips 36 and 37 along opposite sides of the snowmobile seat. Thus, by folding the sides 28 and 29 of the seat pad downwardly about the sides 20b and 20c of the seat 20, the hook-shaped ends 37a engage the fleecy material 36a and detachably secure the pad 26 is position. To remove the pad, the hooklike strips 37 may be peeled away from the fleecy material 36a to enable removal of the seat quickly and efficiently and yet provide a strong and rigid support for the pad while it is in position on the seat. Preferably, the strips 36 and 37 are coextensive.

In operation, the seat 26 will be fabricated as a unit with the strip 38 in which the hook-shaped portion 37a are secured fastened to the undersides of the end portions 28 and 29 by a suitable adhesive. The strips 36 with fleecy, looped surfaces 36a thereon are also supplied and may be secured to the sides 20b and 20c of a snowmobile by means of a suitable adhesive such as an epoxy compound. With the strips 36 in place on opposite sides of the seat 20, the top seat portion 30 is placed upon the top 20a of the seat 20 and the sides 28 and 29 are folded around opposite sides 20b and 20c of the seat. The hook-shaped portions 37 are pressed into engagement with the fleecy material 36a so as securely to fasten the pad 26 to the seat 20 and yet enable its rapid removal therefrom. Although the strips 36 and 37 are illustrated as being connected with the sides of the seat and end portions 29, respectively, it should be understood that they could be interchanged.

It is to be understood that the drawings in descriptive manner are in all cases to be interpreted as merely illustrative of the principles of the invention rather than as limiting the latter in any way since it is contemplated that various changes can be made in the various elements to achieve like results without departing from the spirit of the invention or the scope of the appended claims.

I claim:

1. A detachable seat pad for use on the seat of a snowmobile and the like, said seat including a front portion, an upper portion for supporting a person to be seated thereon, and opposite sides spaced so as to permit the legs of a person seated thereon to normally pass downwardly along said opposite sides, said seat pad comprising:
   an upper heat-reflecting seat portion adapted to overlie the upper portion of such a snowmobile seat;
   first and second heat-reflecting side portions connected to said seat portion and vertically disposed on said opposite sides of said seat; and
   means detachable securing said first and second side portions to said sides of said seat;
   said heat-reflecting upper and first and second side portions each including a layer of heat-insulating material covered by a layer of water impervious material.

2. A detachable seat pad as set forth in claim 1 wherein said heat-reflecting upper and side portions are comprised of first and second continuous outer layers of material and heat-insulating material disposed between said first and second continuous layers;
   said seat pad having reduced cross-sectional areas at two laterally spaced apart, longitudinally extending zones which delineate said upper and side portions.

3. A detachable seat pad as set forth in claim 2 wherein said first and second outer layers are adjoining at said longitudinally extending zones.

4. A detachable seat pad as set forth in claim 2 wherein said means for detachably securing said side portions to the sides of said seat comprises: elongated anchor strip means secured to each side of said seat and means detachably securing one of said first and second layers to said anchor strip means.

5. A detachable seat pad as set forth in claim 4 wherein said means detachably securing one of said first and second layers to said anchor strip comprises nonadhesive strip means extending substantially the length of said side portions; said elongated anchor strip being coextensive in length with said nonadhesive strip means.

6. A detachable seat pad as set forth in claim 5 wherein said nonadhesive strip means comprises a plurality of closely spaced bristles secured to one side thereof, the free ends of said bristles terminating in hooks releasably engageable with said anchor strip means.

7. A detachable seat pad as set forth in claim 1 wherein said first and second side portions each include a side adapted to confront one of said sides of said seat; said means for detachably securing said first and second side portions to the sides of said seat comprises hook means secured to one of said sides of said seat and said seat portions; anchor means secured to the other of said sides of said seat and said seat portions for releasably engaging said hook means.

8. A detachable seat pad as set forth in claim 7 wherein said hook means comprises closely spaced, flexible bristles.

9. A detachable seat pad as set forth in claim 8 wherein said hook means and anchor means are coextensive and extend substantially the length of said sides of said seat.

10. A snowmobile including a seat thereon; said seat including a front portion, an upper portion, and a pair of opposed sides spaced to permit the legs of a person seated thereon to normally pass downwardly along said opposite sides; and a detachable heat-reflecting seat pad for said seat comprising:
    first and second outer continuous layers of material, at least one of said outer layers being water impervious;
    heat-insulating material sandwiched between said first and second layers of material;
    said heat-insulating material including laterally disposed longitudinally extending zones of reduced cross section defining a top portion and first and second side portions;
    said first and second side portions each including a side adapted to confront one of said sides of said seat; and
    means for releasably securing said side portions to said opposite sides of said seat including;
    an elongated nonadhesive strip secured to one of said sides of said seat and said seat portions and including a plurality of closely spaced bristles having hook-shaped terminal ends; and
    an elongated anchor strip secured to the other of said sides of said seat and said seat portions and being coextensive in length with said nonadhesive strip;
    said nonadhesive and anchor strips cooperating to releasably secure said seat pad to said snowmobile seat.